United States Patent [19]

Michell et al.

[11] Patent Number: 5,006,174
[45] Date of Patent: Apr. 9, 1991

[54] SMOKE SUPPRESSANT ADDITIVE FOR HALOGENATED POLYMER COMPOSITION

[75] Inventors: Ernest W. J. Michell, North Harrow; Shona M. Page, Greenford, both of United Kingdom

[73] Assignee: Cookson Group PLC, United Kingdom

[21] Appl. No.: 378,427

[22] Filed: Jul. 10, 1989

Related U.S. Application Data

[63] Continuation of Ser. No. 57,275, Jun. 1, 1987, abandoned.

[30] Foreign Application Priority Data

Jun. 2, 1986 [GB] United Kingdom ................. 8613294

[51] Int. Cl.$^5$ .......................... C08K 3/22; C04B 14/30
[52] U.S. Cl. ..................................... 106/426; 106/425; 106/429; 524/409; 524/411; 524/432; 524/433; 423/331
[58] Field of Search ............... 106/426, 425, 429, 481; 524/409, 411, 432, 433; 423/331

[56] References Cited

U.S. PATENT DOCUMENTS

| | | | |
|---|---|---|---|
| 4,311,635 | 1/1982 | Pearson | 524/430 |
| 4,360,624 | 11/1982 | Huang et al. | 106/306 |
| 4,464,502 | 8/1984 | Jacobs | 524/411 |

*Primary Examiner*—Paul Lieberman
*Assistant Examiner*—Christine A. Skane
*Attorney, Agent, or Firm*—Kenyon & Kenyon

[57] ABSTRACT

A smoke suppressant additive for halogenated polymer compositions which consists of a mixture of from 30 to 70% by weight of zinc oxide and from 70 to 30% by weight of caustic calcined magnesium oxide with the addition thereto of up to 20% by weight of finely divided silica based upon the total weight of the zinc oxide and magnesium oxide, the mixture having being subjected to calcination at a temperature in the range of from 700° to 1100° C. for a period of time of from 1 to 6 hours.

The additive is incorporated into halogenated polymers in an amount of from 0.5 to 10% by weight, preferably about 2.5% by weight.

12 Claims, No Drawings

SMOKE SUPPRESSANT ADDITIVE FOR HALOGENATED POLYMER COMPOSITION

This application is a continuation of U.S. patent application Ser. No. 07/057,275, filed 6/01/87 now abandoned.

The present invention relates to a smoke suppressant additive for halogenated polymer compositions and, in particular, to an improved smoke suppressant for polyvinyl chloride.

British Patent Specification No. 1589821 describes a smoke suppressant for incorporation in halogenated polymer compositions, in particular polyvinyl chloride, which comprises a mixture of zinc oxide and magnesium oxide calcined at a temperature in the range of from 700° to 1100° C.

Experience in the use of this smoke suppressant has shown that it tends to be abrasive and its abrasiveness results in discolouration of polyvinyl chloride owing to the inclusion in the resin of fine particulate metal abraded from the high speed machinery used for mixing the components of the polyvinyl chloride composition. While the tendency of the mixture of magnesium oxide and zinc oxide to sinter and form abrasive particles can be reduced by lowering the temperature of calcination, this has the disadvantage that the zinc oxide in the mixture then has an adverse effect on the thermal stability of the polyvinyl chloride during subsequent processing when it is necessarily heated to fabricate it into tubing or sheet form.

We have now surprisingly discovered that the abrasiveness of a smoke suppressant comprising a mixture of zinc oxide and magnesium oxide can be significantly reduced by incorporating silica into the mixture of oxides prior to calcination.

Accordingly, the present invention provides a smoke suppressant additive for halogenated polymer compositions which consists of a mixture of from 30 to 70% by weight of zinc oxide and from 70 to 30% by weight of caustic calcined magnesium oxide with the addition thereto of up to 20% by weight of finely divided silica based upon the total weight of the zinc oxide and magnesium oxide, the mixture having been subjected to calcination at a temperature in the range of from 700° to 1100° C. for a period of time of from 1 to 6 hours.

The zinc oxide used herein is preferably pure untinted as typically prepared by the French process. By the term "caustic calcined magnesium oxide" as used herein is meant magnesium oxide which has been prepared by calcination at a temperature of below 1000° C.

The additive of the invention preferably comprises from 30 to 50% by weight of zinc oxide and from 70 to 50% by weight of magnesium oxide. A particularly preferred composition comprises about 40% by weight of zinc oxide and about 60% by weight of magnesium oxide.

The finely divided silica used in the present invention is preferably substantially pure fumed or colloidal silica having an average particle size less than 0.5 micrometer, more preferably less than 0.2 micrometer. The silica is included in the additive of the invention in an amount of up to 20% by weight, preferably in an amount of from 5 to 10% by weight, based upon the total weight of the zinc oxide and magnesium oxide.

The smoke suppressant additive of the invention is subjected to calcination at a temperature in the range of from 700° to 1100° C., preferably at a temperature in the range of from 850° to 950° C., for a period of time of from 1 to 6 hours, preferably for a period of time of from 2 to 4 hours.

The smoke suppressant additives of the invention do not exhibit any significant deterioration in terms of their thermal stability at the processing temperature of the halogenated polymer and effectiveness of smoke suppression when compared with the corresponding compositions which do not include silica therein, but exhibit significantly lower abrasiveness when compared to the compositions without silica.

The smoke suppressant additives of the present invention will generally possess a preponderance of particles which are smaller in size then a corresponding composition which does not include silica therein because the inclusion of silica restricts sintering between the major component oxides. The smoke suppressant additives of the invention thus generally exhibit free flowing properties which are attributable to the fine particle size thereof. The additives thus can be more readily dispersed in polyvinylchloride.

In the prior art compositions which do not contain silica the formation of a solid solution between the major components is required to deactivate the zinc oxide, and to a lesser extent the magnesium oxide also, each of which would otherwise promote degradation of hot polyvinylchloride on processing. However, the solid solution is hard and abrasive. The finely divided silica (colloidal or fumed) provides an alternative reagent for deactivation. It coats the major oxide components, and in the case of zinc oxide forms the silicate "willemite", $Zn_2SiO_4$, thereby preventing the zinc oxide from diffusing into the magnesium oxide to form the solid solution. At the same time, this formation of willemite prevents the zinc oxide from acting as a cement which would otherwise bind the major component oxides together in sintered lumps, hence preserving fine particle size with desirable free flowing properties and easy dispersion in polyvinylchloride.

The present invention also includes within its scope admixtures of the smoke suppressant additive with a flame retardant agent for halogenated polymer compositions, such as antimony trioxide.

The present invention furthermore includes within its scope a halogentated polymer composition which contains therein from 0.5 to 10% percent by weight, preferably about 2.5 percent by weight of the smoke suppressant of the invention.

The present invention will be further described with reference to the following Examples in which parts and percentages are by weight unless otherwise stated.

EXAMPLE 1

Mixtures of zinc oxide, magnesium oxide and colloidal silica in the weight ratio of 8:12:1 (or expressed alternatively, 40:60:5) were roller mixed for eighteen hours and 120 g portions thereof calcined at 800° and 900° C. The temperature was raised from ambient temperature at the rate of 10° C. per minute and the final temperature held for two hours.

To measure the abrasiveness of the samples quantitatively, semi-rigid polyvinyl chloride formulations were made confirming to the following composition and incorporating, as appropriate, one of each of the experimental preparations, or an industrially prepared control composition.

| Component | Parts by weight |
|---|---|
| Polyvinyl chloride resin | 2000 g |
| Dioctyl phthalate plasticizer | 300 g |
| Tribasic lead sulphate stabilizer | 100 g |
| Calcium stearate lubricant | 20 g |
| Antimony oxide flame-retardant | 50 g |
| Smoke suppressant prepared as described (or control) | 50 g |

Each batch was mixed in a high-speed mixer according to a precisely reproduced schedule. Part of each batch was used to make a sheet of semi-rigid polyvinyl chloride by means of a standardised procedure using a heated two-roll mill. The final sheets measured 450×160×1.1 mm approximately. The colour of squares cut from each sheet and measuring 100×100 mm was measured using a Micromatch 2000 Spectrophotometer (International Colour Systems) calibrated using standard black and standard white panels. The lightness/darkness value "L" of each mixture is listed in Table 1. On the scale used pure white is read as 100 and dead black as 0, so that samples giving higher readings are less discoloured. Discolouration in this test is caused by the dispersion of finely divided metallic matter abraded from the internal surfaces of the high-speed mixer.

TABLE 1

Lightness of polyvinyl chloride samples as a function of calcining temperature

| Smoke suppressant sample | Lightness/Darkness difference value (dL) |
|---|---|
| Sample with Silica, calcined at 800° C. | +6.0 |
| Sample with Silica, calcined at 900° C. | +3.3 |
| Industrially produced Ongard II (British Pat. No. 1589821) | control |

The lightness figures listed indicate a marked reduction in metal pick-up and thus abrasiveness in the silica-modified smoke-suppressant calcined at 800° C., and a significant reduction in the material calcined at 900° C.

EXAMPLE 2

Samples of a 60% by weight magnesium oxide: 40% by weight of zinc oxide composition and corresponding samples with the addition of 2%, 5% and 7% by weight of fumed silica were prepared from Magox "Premium" magnesium oxide, Canfelzo 17-31 zinc oxide and CAB-0-SIL M5 fumed silica by mixing in a domestic planetary food mixer. The mixture was then calcined at 850° C. for periods of 0.5, 1, 2, 4, 6 or 8 hours.

The various smoke suppressant additives so prepared were included in the following formulations for semi-rigid polyvinyl chloride.

| Component | Parts by weight |
|---|---|
| Polyvinyl chloride resin | 100.0 |
| Dioctyl phthalate plasticizer | 30.0 |
| Tribasic lead sulphate stabilizer | 5.0 |
| Calcium stearate lubricant | 1.0 |
| Antimony trioxide flame retardant | 2.5 |
| Smoke suppressant additive | 2.5 |

Blends of the above formulation were milled into hides for testing. The abrasiveness of the samples was tested in the manner described in Example 1.

Table 2 below gives the lightness values for the samples calcined at 850° C. for different periods of time. High lightness values show low abrasion, and vice-versa.

TABLE 2

| Fired For: | Percentage Silica Dopant | | | |
|---|---|---|---|---|
| | 0% | 2% | 5% | 7% |
| 0.5 hrs | 81.8 | 83.5 | 84.6 | 86.0 |
| 1.0 hrs | 80.5 | 86.6 | 83.0 | 84.2 |
| 2.0 hrs | 79.5 | 80.7 | 82.4 | 84.4 |
| 4.0 hrs | 78.9 | 82.0 | 83.9 | 85.1 |
| 6.0 hrs | 80.1 | 81.8 | 82.9 | 84.4 |
| 8.0 hrs | 81.0 | 81.5 | 83.3 | 83.6 |

EXAMPLE 3

The procedure of Example 2 was repeated, except that the samples of the smoke suppressant additives were calcined at a temperature of 900° C.

Table 3 below gives lightness values for samples calcined at 900° C. for different periods of time. High lightness values show low abrasion, and vice-versa.

TABLE 3

| Fired For: | Percentage Silica Dopant | | | |
|---|---|---|---|---|
| | 0% | 2% | 5% | 7% |
| 0.5 hrs | 82.3 | 80.9 | 81.4 | 82.7 |
| 1.0 hrs | 77.0 | 78.7 | 81.3 | 82.8 |
| 2.0 hrs | 77.2 | 78.8 | 81.7 | 82.9 |
| 4.0 hrs | 75.3 | 77.4 | 81.9 | 82.7 |
| 6.0 hrs | 74.9 | 77.0 | 79.4 | 81.6 |
| 8.0 hrs | 77.1 | 79.4 | 80.5 | 82.1 |

EXAMPLE 4

The procedure of Example 2 was repeated, except that the samples of the smoke suppressant additives were calcined at a temperature of 950° C.

Table 4 below gives lightness values for samples fired at 950° C. for different period of time. High lightness values show low abrasion and vice-versa.

TABLE 4

| Fired For: | Percentage Silica Dopant | | | |
|---|---|---|---|---|
| | 0% | 2% | 5% | 7% |
| 0.5 hrs | 74.7 | 76.2 | 78.5 | 81.4 |
| 1.0 hrs | 75.4 | 75.5 | 78.4 | 80.7 |
| 2.0 hrs | 75.4 | 76.2 | 78.7 | 80.1 |
| 4.0 hrs | 74.8 | 75.6 | 77.4 | 79.9 |
| 6.0 hrs | 75.2 | 76.1 | 77.3 | 80.2 |
| 8.0 hrs | 76.3 | 75.2 | 76.4 | 75.8 |

EXAMPLE 5

Mixtures of Steetley "Lycal 96/57S" magnesium oxide with Durham "200" zinc oxide in the weight ratio of 60% MgO: 40% ZnO, and corresponding mixtures with the addition of 2, 5 and 7% by weight of CAB-O-SIL M5 fumed silica, were calcined at 800° C., 900° C. and 1000° C. The CAB-O-SIL M5 fumed silica has a preponderance of small particles and an average particle size of about 0.5 micrometers. The products so formed were divided into portions for testing.

Portions of each experimental smoke suppressant were sieved through a series of known hole sizes (63, 90, 125, 250, 500 and 1000 micrometers corresponding to the British Standard mesh numbers 240, 170, 120, 60, 30 and 16, respectively). The fractions retained on each sieve, and that passing through each sieve, were weighed. The distribution of particle sizes for undoped samples and samples with 2%, 5%, and 7% silica addition calcined at the three different temperatures are given in Table 5 below.

TABLE 5

| DOPING | 0 wt % SILICA | | | 2 wt % SILICA | | |
|---|---|---|---|---|---|---|
| TEMPERATURE | 800° C. | 900° C. | 1000° C. | 800° C. | 900° C. | 1000° C. |
| APERTURE | | | | | | |
| >1.00 mm | 4.43 | 3.84 | 3.23 | 0.69 | 0.28 | 0.06 |
| >500 μm | 7.67 | 7.71 | 9.00 | 3.53 | 1.56 | 0.27 |
| >250 μm | 6.73 | 5.92 | 5.42 | 10.40 | 1.93 | 0.54 |
| >125 μm | 5.51 | 8.18 | (44.60) | 10.76 | 7.23 | 2.52 |
| >90 μm | 6.24 | (34.42) | (32.82) | 11.43 | 25.97 | 21.42 |
| >63 μm | (18.52) | (25.15) | 4.25 | (24.16) | (34.45) | (33.75) |
| <63 μm | (50.94) | 14.79 | 0.64 | (38.47) | (27.95) | (40.90) |
| DOPING | 5 wt % SILICA | | | 7 wt % SILICA | | |
| TEMPERATURE | 800° C. | 900° C. | 1000° C. | 800° C. | 900° C. | 1000° C. |
| APERTURE | | | | | | |
| >1.00 mm | 1.40 | 0.36 | 0.70 | 2.58 | 1.90 | 0.89 |
| >500 μm | 3.00 | 2.14 | 1.13 | 4.39 | 2.06 | 1.70 |
| >250 μm | 6.88 | 1.96 | 1.35 | 6.49 | 2.16 | 1.52 |
| >125 μm | 16.08 | 6.69 | 2.08 | 12.64 | 3.92 | 3.83 |
| >90 μm | 14.69 | 11.33 | 7.70 | 12.41 | 22.70 | 2.45 |
| >63 μm | (16.46) | 12.28 | 7.00 | (13.78) | 11.34 | 14.85 |
| <63 μm | (40.46) | (63.70) | (78.27) | (45.73) | (55.09) | (63.65) |

Three features are evident from this Table. First, distributions for the undoped samples changed markedly towards a preponderance of larger particle sizes as the calcining temperatures increased. Second, distributions for the 2 wt % silica doped samples were relatively constant, showing a preponderance of smaller particles at all calcining temperatures. Third, distributions for the 5 wt % and 7 wt % silica doped samples changed towards smaller particle sizes as the calcining temperature increased, again with a preponderance of smaller particles at all temperatures. This shows that silica doping restricted sintering between the major component oxides.

This example thus illustrates the fine particle size retention which can be associated with desirable free flowing properties and improved dispersion in the polyvinylchloride.

EXAMPLE 6

Mixtures of Steetley "Lycal 96/57S" magnesium oxide with Durham "200" zinc oxide in the weight ratio of 60% MgO: 40% ZnO, and corresponding mixtures with the addition of 2, 5 and 7% by weight of CAB-O-SIL M5 fumed silica, were calcined at 800° C., 900° C. and 1000° C.

Samples of these materials were milled into polyvinyl chloride hides for evaluation of the thermal stability, and smoke generation.

Table 6 below gives the number of hours of testing in air at 180° C. before the onset of permanent char. The reference compound ONGARD II is a commercially available smoke suppressant.

TABLE 6

| | samples fired at 800° C. hours | samples fired at 900° C. hours | samples fired at 1000° C. hours |
|---|---|---|---|
| 0 wt % Silica | 4.4 | 6.1 | 6.5 |
| 2 wt % Silica | 4.7 | 5.9 | 6.5 |
| 5 wt % Silica | 4.7 | 5.7 | 5.6 |
| 7 wt % Silica | 3.9 | 5.7 | 6.0 |
| REF. ONGARD II | 5.9 | | |

Table 7 below gives smoke suppression values measured in accordance with ASTM Test Method No. ANSI/ASTM E662-79. This is commonly called the NBS (National Bureau of Standards) Smoke Box Test. The percentage deviation values given in this Table show how much the smoke suppressant values deviate from the mean values of the samples calcined at any one temperature. The reference compound is ONGARD II which is commercially available.

TABLE 7

| | samples fired at 800° C. | | samples fired at 900° C. | | samples fired at 1000° C. | |
|---|---|---|---|---|---|---|
| | Dmax | % dev. | Dmax | % dev. | Dmax | % dev. |
| 0 wt % Silica | 318 | −5% | 373 | +6% | 363 | −5% |
| 2 wt % Silica | 354 | +6% | 348 | −1% | 380 | −1% |
| 5 wt % Silica | 321 | −4% | 341 | −3% | 395 | +3% |
| 7 wt % Silica | 337 | +1% | 342 | −3% | 392 | +2% |
| REF. ONGARD II | 342 | | | | | |

With regard to this particularly test the results are not considered to be significantly different.

EXAMPLE 7

Lightness (L) values and thermal stabilities in hours (TS) were determined for semi-rigid polyvinylchloride hides milled from speed mixed components including experimental smoke suppressants prepared from Durham "200" zinc oxide and Magox "Premium" magnesium oxide with 10 wt % added CAB-O-SIL M5 fumed silica and then calcined at 900° C. for two hours.

| ZnO | 40 | 50 | 60 | 70 |
|---|---|---|---|---|
| MgO | 60 | 50 | 40 | 30 |
| L | 86.6 | 86.5 | 86.3 | 87.0 |

| -continued | | | |
|---|---|---|---|
| TS (h) | 6+ | 6+ | 4.3 | 4.3 |

The values for polyvinyl chloride containing a commercial undoped smoke suppressant ONGARD II having a 60 wt % MgO/40 wt % ZnO composition are:

| L | 79.4 |
|---|---|
| TS (h) | 6+ |

The TS test was scheduled for 6 hours maximum; polyvinylchloride hides which gave better TS than this are shown as "6+".

There was no significant difference in smoke suppressance between hides milled with these samples, the performance for the experimental materials matching that for the commercial undoped material and vice versa.

EXAMPLE 8

The lightness differences (dL) between semi-rigid polyvinylchloride hides milled with experimental smoke suppressants having varying MgO/ZnO ratios and calcined with various amounts of fumed silica at various temperatures were compared with an undoped 60 wt % MgO/40 wt % ZnO prepared at 900° C.

| Durham ZnO | | 50 | 60 | 70 |
|---|---|---|---|---|
| Steetley MgO | | 50 | 40 | 30 |
| no silica | | 1.9 | 3.1 | 5.8 |
| 850° C. | 5 wt % SiO$_2$ | 5.0 | 7.6 | 8.1 |
| 850° C. | 10 wt % SiO$_2$ | 8.8 | 10.0 | 11.0 |
| no silica | | 2.9 | 2.6 | 3.7 |
| 900° C. | 5 wt % SiO$_2$ | 1.4 | 5.6 | 7.3 |
| 900° C. | 10 wt % SiO$_2$ | 6.6 | 9.1 | 10.3 |
| no silica | | 1.0 | 3.34 | 4.9 |
| 950° C. | 5 wt % SiO$_2$ | 0.1 | 4.3 | 5.6 |
| 950° C. | 10 wt % SiO$_2$ | 6.7 | 8.6 | 9.4 |

As the zinc oxide content, or as the fumed silica content, increases (or as both contents increase) for a product calcined at any one temperature, the lightness values increase above that for the reference material of nominal 60 wt % MgO/40 wt % ZnO composition calcined without silica at 900° C.

Accordingly, the abrasiveness of these products decreases (because lightness is an inverse measure of abrasiveness). However, as found for the experiments of Example 7 there was no tendency for smoke suppression to improve with zinc oxide content, and there was a trend for the thermal stability of the polyvinylchloride hide to decrease with increasing zinc oxide content.

We claim:

1. A smoke suppressant additive for halogenated polymer compositions which comprises a starting mixture consisting of from 30% to 70% by weight of zinc oxide and from 70% to 30% by weight of caustic calcined magnesium oxide, the starting mixture having been doped with a positive amount of up to 20% by weight of finely divided silica based upon the total weight of the zinc oxide and magnesium oxide, and the silica-doped mixture having been subjected to calcination at a temperature in the range of from 700° to 1100° C. for a period of time of from 1 to 6 hours.

2. An additive according to claim 1 wherein the starting mixture consists of from 30% to 50% by weight of zinc oxide and from 70% to 50% by weight of magnesium oxide.

3. An additive according to claim 1 wherein the starting mixture consists of about 40% by weight of zinc oxide and about 60% by weight of magnesium oxide.

4. An additive according to claim 1 wherein the starting mixture is doped with about 5% to 10% by weight of finely divided silica based upon the total weight of zinc oxide and magnesium oxide.

5. An additive according to claim 1 wherein the finely divided silica is substantially pure fumed or colloidal silica.

6. An additive according to claim 5 wherein the finely divided silica has an average particle size of less than 0.5 micrometer.

7. An additive according to claim 1 wherein the calcination of the silica-doped mixture is carried out at a temperature in the range of from 850° to 950° C.

8. An additive according to claim 1 wherein the calcination of the silica-doped mixture is carried out for a period of time of from 2 to 4 hours.

9. An additive according to claim 1 further comprising a flame retardant agent for halogenated polymer compositions.

10. An additive according to claim 9 wherein the flame retardant agent comprises antimony trioxide.

11. A halogenated polymer composition which contains a smoke suppressant additive therein in an amount of from 0.5% to 10% by weight of the polymer.

12. A halogenated polymer composition according to claim 11 wherein the smoke suppressant additive is incorporated therein in an amount of about 2.5 percent by weight of the polymer.

* * * * *